United States Patent
Cunningham

[11] Patent Number: 6,004,072
[45] Date of Patent: Dec. 21, 1999

[54] SELF-ORIENTING SUBSEA FLOWLINE TAPPING ARRANGEMENT

[75] Inventor: Christopher E. Cunningham, Spring, Tex.

[73] Assignee: FMC Corporation, Chicago, Ill.

[21] Appl. No.: 09/150,473

[22] Filed: Sep. 9, 1998

Related U.S. Application Data

[60] Provisional application No. 60/058,029, Sep. 10, 1997.

[51] Int. Cl.[6] .............................. F16L 1/04; F16L 35/00
[52] U.S. Cl. ........................ 405/170; 166/343; 285/31; 405/171; 405/158
[58] Field of Search ............................. 405/158, 169–172, 405/154, 188–191; 166/338–344; 269/43, 37; 285/31, 133.11, 133.21, 133.3, 273, 274, 272

[56] References Cited

U.S. PATENT DOCUMENTS

| | | |
|---|---|---|
| 320,771 | 6/1885 | Cunningham . |
| 481,935 | 9/1892 | Dunham ................................ 285/31 X |
| 666,316 | 1/1901 | Kenneally .............................. 285/31 X |
| 3,603,617 | 9/1971 | Lochridge . |
| 3,781,041 | 12/1973 | Petzetakis . |
| 5,018,903 | 5/1991 | O'Donnell et al. .................. 405/158 X |
| 5,033,907 | 7/1991 | O'Donnell et al. .................. 166/343 X |
| 5,044,672 | 9/1991 | Skeels et al. . |
| 5,056,755 | 10/1991 | Jang et al. ............................. 285/31 X |
| 5,131,697 | 7/1992 | Shumway .............................. 285/31 X |

FOREIGN PATENT DOCUMENTS 555708   3/1957   Belgium .

*Primary Examiner*—Dennis L. Taylor
*Attorney, Agent, or Firm*—Gary L. Bush; Mayor, Day, Caldwell & Keeton L.L.P.

[57] ABSTRACT

A subsea flowline (10) deployed onto the sea floor (S) has tie-in points for interfacing other subsea facilities. Mudmats (14A, 14B, 14C) support hubs (16A, 16B, 16C) at the tie-in points. One embodiment shown in FIG. 2 has a cradle (22) supporting flowline (10) for relative rotative movement. Hydraulic jacks (26) are connected to arms (24) to position and maintain hub (16) in a vertical orientation. Another embodiment, shown in FIG. 3, has an outer swivel sleeve (21A) which is mounted on mudmat (14A) and receiving flowline (10A) for relative rotation. An annular fluid chamber or toroid (25A) provides fluid communication between flowline (10) and hub (16A) connected to outer swivel sleeve (21A). Another embodiment, shown in FIG. 4, combines the features and characteristics illustrated in FIGS. 2 and 3.

18 Claims, 2 Drawing Sheets

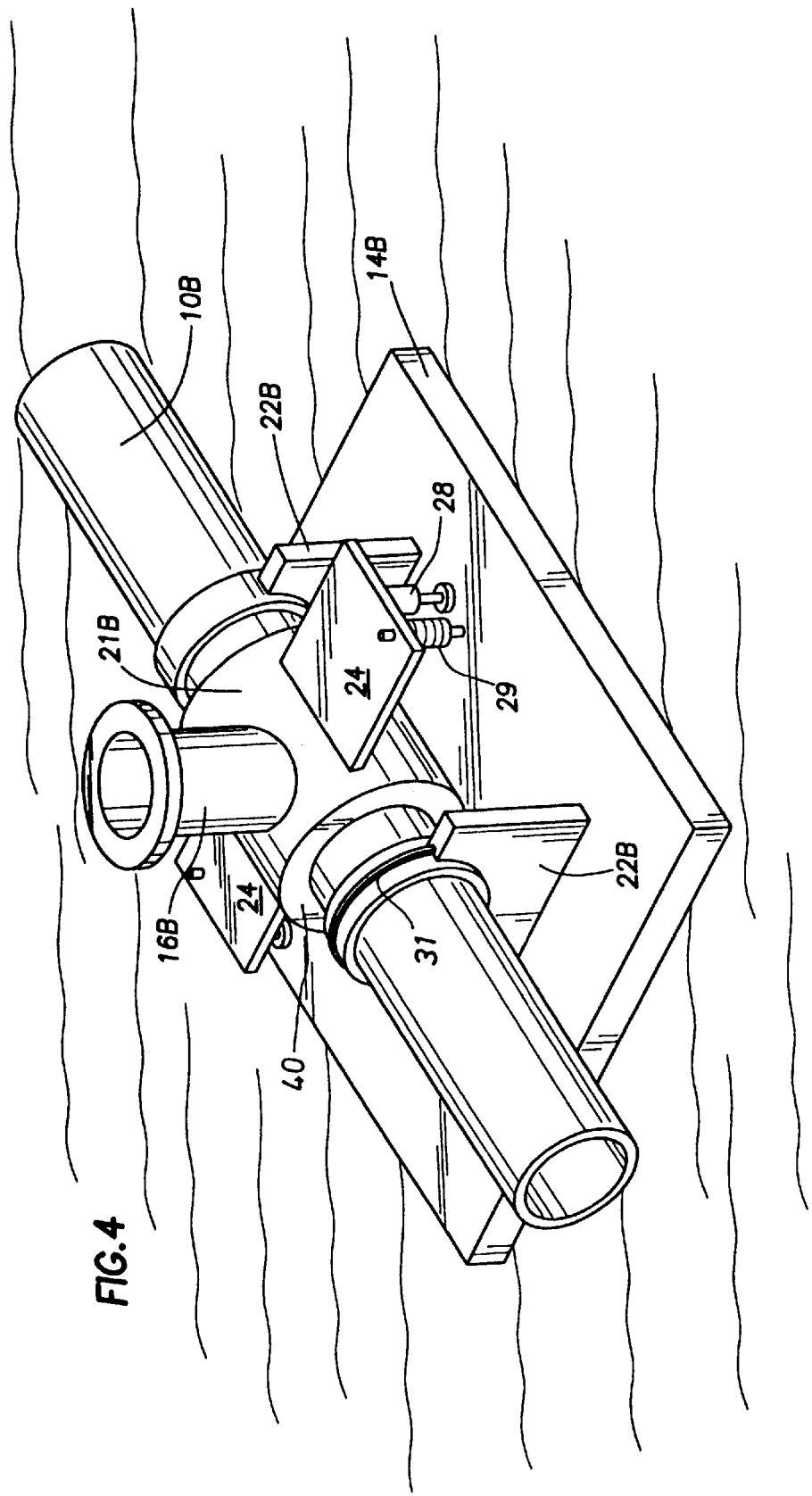

SELF-ORIENTING SUBSEA FLOWLINE TAPPING ARRANGEMENT

REFERENCE TO RELATED PROVISIONAL APPLICATION

This application claims the benefit of provisional application Ser. No. 60/058,629 filed Sep. 10, 1997.

TECHNICAL FIELD OF THE INVENTION

This invention relates to a device that may be integrated at various points along the length of a flowline as the flowline is laid to provide tie-in points (typically hubs) for later use. The tie-in points may be accessed by a flowline or "jumper" of some form to connect a xmas tree or manifold system thereto, for example.

DESCRIPTION OF THE PRIOR ART

It is desirable for some applications that "tapping points" be provided at various points along the length of subsea flowlines. An obvious approach to satisfy this desire would be simply to weld in hubs along the length of the flowline at the desired locations as part of the installation process. When installed subsea, however, there is no assurance that the hubs provided in this manner will end up vertically oriented, such as is desired to facilitate subsequent subsea interfacing. Non-vertical positioning of the hubs may occur as a result of residual torque in the main flowline, unstable soil conditions on the sea floor, a non-level sea floor, and other conditions encountered during lowering of the flowline onto the sea floor.

OBJECT OF THE INVENTION

A primary object of the invention is to provide one or more arrangements by which tapping points along a subsea flowline may be provided with hubs or similar interfacing facilities which are assured of being in a substantially vertical position after completion of the flowline installation, stabilization and commissioning processes.

SUMMARY

For this invention, the object of providing a vertically accessible hub is achieved even if the flowline "twists" as it is laid on the sea bed, and even if the sea bed is not level.

Two separate embodiments of the invention are illustrated. A first embodiment includes a hub fixed to a flowline, which in turn is rotatably carried in a cradle fixed to a mudmat. Hydraulic jacks reacted against the mudmat are actuated to twist the flowline an amount necessary to orient the hub vertically.

A second embodiment is provided in which the hub is secured to an outer swivel sleeve or collar which itself is secured to a mudmat and receives the flowline such that the flowline can rotate inside it. With the mudmat supported on the sea floor in a generally horizontal plane, the hub extends in a vertical direction from the mudmat while the flowline rotates within it during its installation phase as it relieves built-up installation torque. Of course, sealing means are provided at the interface of the collar with the flowline.

A combination of the first and second embodiments is also disclosed.

By maintaining the flowline tapping hub in a vertical orientation, connections to Christmas trees or other subsea equipment may be more easily and reliably achieved.

BRIEF DESCRIPTION OF THE DRAWINGS

FIG. 4 is a perspective view of a third embodiment of the invention which combines features of the embodiments of FIGS. 2 and 3.

DESCRIPTION OF THE INVENTION

Figure 1:
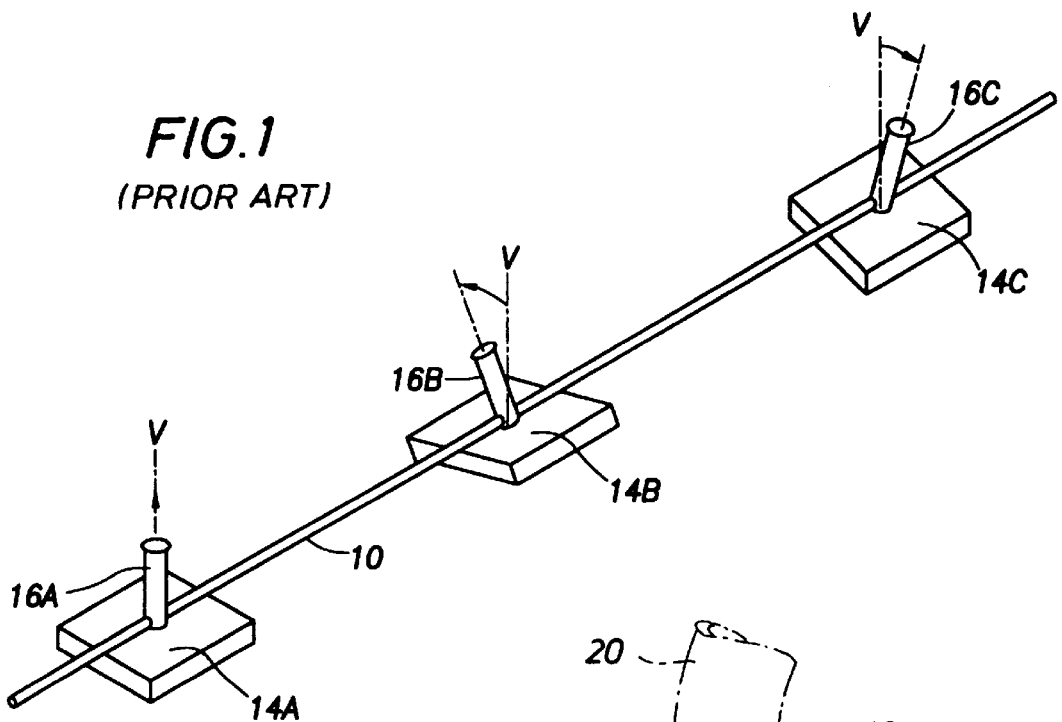
FIG. 1 is a diagrammatic view of a prior art flowline/hub arrangement which illustrates possible non-vertical orientations of hubs which are fixed with respect to a flowline.

As shown in FIG. 1, a prior art flowline 10 has a plurality of tapping points with mudmats 14A, 14B, 14C and hubs 16A, 16B, 16C spaced along its length. The prior art mudmat/hub arrangement has provided for a substantially fixed connection between the flowline 10 and the hub 16 as it is installed on the sea bed. Flowline 10 may extend to a suitable subsea production or gathering facility, or to a surface facility for storage or transport. Each mudmat 14A, 14B, 14C is of a size having sufficient surface contact area with the sea floor to provide adequate support to maintain hubs 16A, 16B, 16C of flowline 10 above the sea floor. Each hub is fixedly unitized in flowline 10 and has a profile for connection to a Christmas tree (not shown), flowline jumper, or other subsea production arrangement.

Three mudmat/hub examples are shown. The mudmat 14A/hub 16A arrangement is installed correctly with hub 16A extending along the vertical, V. The mudmat 14B/hub 16B and the mudmat 14C/hub 16C are shown misaligned relative to vertical as a result of twisting of the flowline 10 during the installation process, or because of a non-level sea bed, etc.

Figure 2:
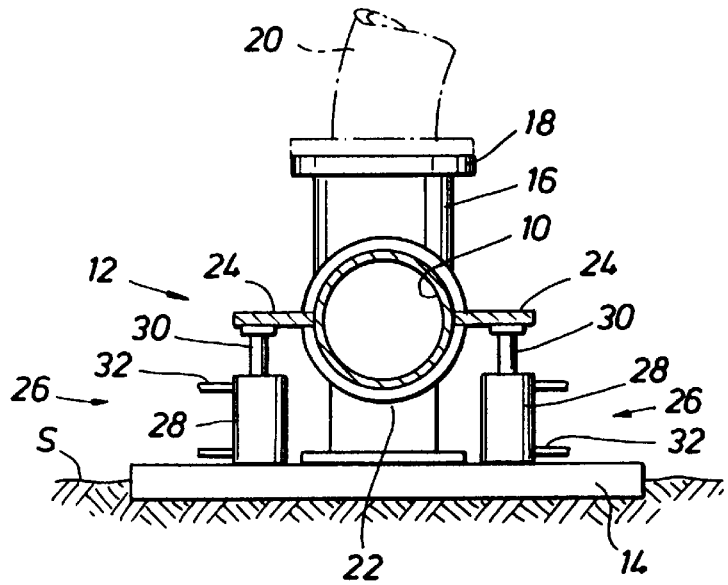
FIG. 2 is an end elevational view, partly diagrammatic, showing a first embodiment of the invention in which a flowline/hub arrangement includes means to rotate or twist the flowline a limited amount with respect to a mudmat to facilitate vertical orientation of the hub.

Embodiment of FIG. 2

Referring to FIG. 2, a mudmat 14 is shown on sea bed S. Flowline 10 is supported within a cradle/collar 22 which is secured to mudmat 14. Flowline 10 may be a metallic tube or it may be a flexible hose or pipe well known in the art of subsea oil and gas well production facilities. Flowline 10 is free to rotate with respect to cradle 22 while it is supported thereon. A suitable stop is provided on said flowline 10 or on said cradle 22 to prevent relative longitudinal movement of said flowline with respect to said cradle. A hub 16 is mounted on flowline 10 and provides fluid communication with flowline 10. Opposed alignment arms 24 are secured to hub 16/flowline 10 and extend laterally outward therefrom. Hub 16 incorporates an upper profile which facilitates interfacing with a suitable fluid conduit 20 normally extending to another subsea facility.

Hydraulic jacks generally indicated at 26 each have a lower cylinder 28 secured to mudmat 14 and a piston rod 30 secured to an alignment arm 24. The jacks could be inverted as well. Furthermore, one of the jacks 28 could be replaced by a "hinge" to interface one of the arms 24 with the mudmat 14, leaving the other jack as the single active element available for twisting the flowline 10. Hydraulic fluid connections 32 are arranged and designed for interface by a diver or a remotely operated vehicle (ROV), etc., for actuation of jacks 26 and leveling of arms 24. As a result, hub 16 may be rotated or twisted to a vertical position even if mudmat 14 is positioned on a sloping sea bed S with respect to a horizontal plane or if residual installation torque in the flowline causes the hub to naturally point in a non-vertical direction.

Means may be provided for selectively locking the flowline 10 against axial or rotational movement relative to the mudmat.

In summary the embodiment of the invention of FIG. 2 is characterized by arrangements for twisting the flowline 10 with respect to mudmat 14 to orient hub 16.

Figure 3:
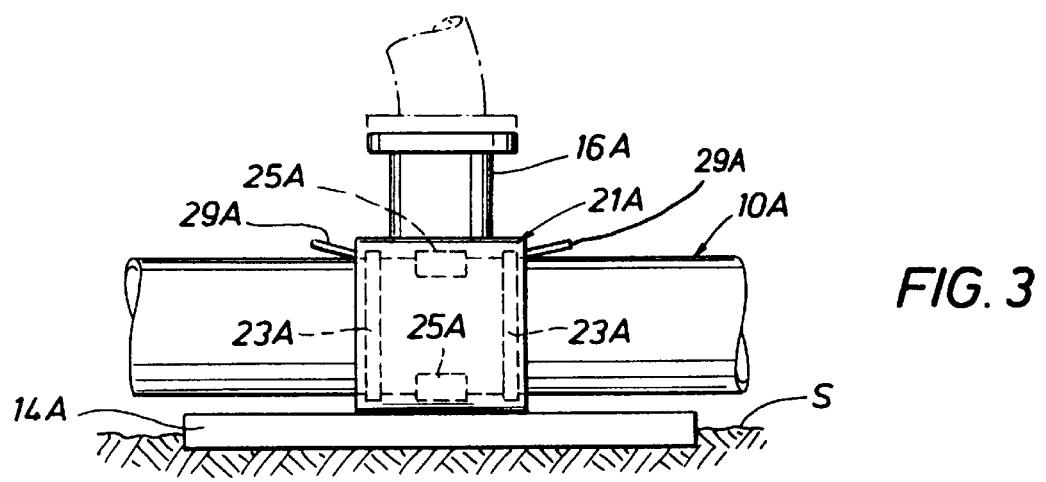
FIG. 3 is a side elevational view of a second embodiment of the invention in which the flowline is free to rotate in a collar relative to the hub and a supporting mudmat.

Embodiment of FIG. 3

The rotatable fluid coupling arrangement of FIG. 3 permits unlimited rotation of flowline 10A relative to a stationary, vertically oriented interface 16A. Interface 16A (hence forward referred to as hub 16A) is secured to an outer swivel sleeve or "collar" 21A which is secured to mudmat 14A.

Thus, hub 16A, collar 21A, and mudmat 14A form a fixed structure, yet a structure that it is arranged and designed such that flowline 10A may rotate within collar 21A and thereby with respect to vertically oriented hub 16A. Annular seals 23A are provided between flowline 10A and outer swivel sleeve 21A. A toroid 25A or similar arrangement is provided between flowline 10A and swivel sleeve 21A to provide fluid communication between hub 16A and flowline 10A. Suitable stops within outer sleeve 21A prevent relative longitudinal movement of flowline 10A there-within. Seals 23A may be elastomeric seals effective at all times, even during relative rotation of flowline 10A within sleeve 21A. Upon pressurizing of flowline 10A, metal-to-metal seals may be energized to provide enhanced sealing. A suitable metal-to-metal and elastomeric sealing pipe swivel joint, with integral selective anti-rotation capability, is shown in U.S. Pat. No. 5,044,672 dated Sep. 3, 1991, the entire disclosure being incorporated by this reference for all purposes. A suitable sealing compound may, if desired, be injected through an arrangement schematically indicated by fitting 29A to provide sealing in the event of failure of the primary seals.

In summary, the embodiment of FIG. 3 of the invention is characterized by arrangements such that the flowline 10A is free to twist within a "mudline-angle-based" hub sleeve 21A.

Combined Embodiment of FIGS. 2 and 3 . . . FIG. 4

The embodiment of FIG. 2 provides an arrangement in which a positive action (i.e., the actuation of jacks 26) is required to position hub 16 to a vertical relation if a vertical orientation is not achieved when the flowline is installed on the sea bed.

The embodiment of FIG. 3 provides an arrangement in which no action is required to be taken in order for hub 16A to be positioned in a vertical direction if mudmat 14A is positioned in a horizontal plane. Any twisting of flowline 10A due to residual torque resulting from installation will not affect the position of hub 16A. However, if mudmat 14A is positioned on an inclined sea bed relative to a horizontal plane, such as may result from unstable soil conditions or because of a sloping sea bed, hub 16A will not point in a vertical direction in the embodiment of FIG. 3. For this purpose, the embodiments of FIGS. 2 and 3 are combined in FIG. 4 so that the flowline 10B is mounted within a swivel 21B for relative rotation with respect to a collar/hub arrangement as in the embodiment of FIG. 3. In the combined arrangement, hydraulic jacks 28 may be provided as in FIG. 2 to position the hub 16B vertically even if the associated mudmat is inclined with respect to the sea floor. In addition, or alternatively, ROV operated screw jacks 29 may be provided on each (typically one or two) of the opposed arms 24. The screw jacks 29 serve alone, or in combination with hydraulic jacks 28, to twist the swivel 21B and to lock-in the rotational position of swivel 21B. A stop, or enlarged diameter ring 31 (as one example) prevents relative longitudinal movement of said flowline 10B with respect to the cradle 22B and mudmat 14B. The outer end 40 of the swivel sleeve also stops it and flowline 10B to which it is secured from relative longitudinal movement. Thus, the embodiments of FIGS. 2 and 3 may be to combined, as in FIG. 4, as may be desirable under certain conditions.

While preferred embodiments of the present invention have been illustrated and/or described in some detail, modifications and adaptions of the preferred embodiments will occur to those skilled in the art. Such modifications and adaptations are within the spirit and scope of the present invention.

What is claimed is:

1. In combination with a subsea flowline deployed on a sea floor and extending generally in a horizontal direction with said flowline having a longitudinal axis, a tapping device having a tapping axis which is substantially perpendicular with said flowline axis and is positioned at a predetermined location along the length of said subsea flowline, said tapping device having mean for coupling to said flowline which allows said tapping axis to remain in a generally vertical direction with respect to said sea floor while providing the capability of said flowline to twist with respect to said structure about said flowline axis.

2. The combination of claim 1 wherein said combination includes, a mudmat supported on the sea floor beneath the flowline at the tapping point, flowline attachment means extending upwardly from the mudmat for supporting the flowline thereon and for permitting relative rotative movement of said flowline with respect to said mudmat, and a fluid conduit connected to said flowline at said tapping location and extending in a generally vertical direction.

3. The combination of claim 2 wherein, a hub is coupled to said fluid conduit and mounted on said flowline and extends in a generally perpendicular relation to the flowline, and an orienting means is operatively connected between said hub and said flowline to position and maintain said hub in a generally vertical direction.

4. The combination of claim 3 wherein, said orienting means comprises an outer swivel sleeve which is carried by said mudmat and receives said flowline therein for permitting relative rotation of said flowline within said outer swivel sleeve, said hub secured to and being in fluid communication with said outer swivel sleeve, and an annular fluid chamber between said outer swivel sleeve and said flowline is arranged and designed to permit fluid flow between said subsea flowline and said fluid conduit.

5. The combination of claim 4 wherein, said outer swivel sleeve is arranged and designed for selective rotation with respect to said mudmat, and further comprising, means for selectively locking said swivel sleeve against rotation relative to said mudmat.

6. The combination of claim 4 wherein, said outer swivel sleeve is arranged and designed for selective rotation with respect to said flowline, means for selectively locking said swivel sleeve against rotation relative to said flowline.

7. The combination of claim 3 wherein, said orienting means includes a cradle for rotatively supporting said flowline and arms which extend outwardly from opposed sides of said hub, and hydraulic fluid means are operatively connected between said arms and said mudmat for positioning said hub in a vertical orientation.

8. The combination of claim 4 wherein, said orienting means includes arms which extend outwardly from opposed sides of said outer swivel sleeve, and hydraulic fluid means are operatively connected to said arms for positioning said hub in a vertical orientation.

9. The combination of claim 4 further comprising, a stop coupled with said outer swivel sleeve to prevent relative longitudinal movement of said flowline with respect to said outer sleeve.

10. The combination of claim 7 further comprising, a stop defined between said cradle and said flowline to prevent relative longitudinal movement of said flowline with respect to said cradle.

11. A tapping structure for a subsea flowline deployed onto a sea floor at a predetermined tapping point, said tapping structure comprising, a mudmat supported on the sea floor beneath the flowline, a cradle sleeve mounted on the mudmat which receives the subsea flowline therein and is arranged and designed to permit relative rotative movement of the flowline, a fluid conduit fixed to said flowline for fluid communication therebetween which extends generally perpendicularly to said flowline, and orienting means connected to said fluid conduit to position and maintain said fluid conduit in a generally vertical direction.

12. The tapping support structure of claim 11 wherein said orienting means comprises, arms extending outwardly from opposed sides of said fluid conduit, and hydraulic fluid means operatively connected between said arms and said mudmat for rotating said fluid conduit with respect to said mudmat in a generally vertical direction.

13. The tapping support structure of claim 12 wherein, said hydraulic fluid means includes a piston and cylinder arrangement for each of said arms.

14. The tapping support structure of claim 11 further comprising, means for preventing axial movement of said flowline relative to said mudmat.

15. The tapping support structure of claim 11 further comprising, means for selectively locking said flowline against rotational movement relative to said mudmat.

16. A tapping structure for a subsea flowline deployed onto a sea floor at a predetermined tapping point, said tapping structure comprising, a mudmat supported on the sea floor beneath the flowline, an outer swivel sleeve mounted on said mudmat and receiving said flowline therein which is arranged and designed to permit relative rotation of said flowline and said outer swivel sleeve, a fluid conduit secured to said outer swivel sleeve for fluid communication therebetween and extending generally perpendicularly to said flowline, and an annular fluid chamber between said outer swivel sleeve and said flowline to permit fluid flow between said flowline and said fluid conduit.

17. The tapping structure of claim 16 further comprising, stops disposed between said outer swivel sleeve and said flowline to limit longitudinal movement of said flowline.

18. The tapping structure of claim 16 further comprising, means for selectively locking said flowline against rotational movement relative to said swivel sleeve.

* * * * *